United States Patent [19]

Haas

[11] Patent Number: 4,530,247
[45] Date of Patent: Jul. 23, 1985

[54] TIMED GAS METERING AND DISTRIBUTION SYSTEM

[75] Inventor: Aarne T. Haas, Portland, Oreg.

[73] Assignee: Northwest Natural Gas Company, Portland, Oreg.

[21] Appl. No.: 475,609

[22] Filed: Mar. 15, 1983

[51] Int. Cl.³ .............................................. G01F 1/00
[52] U.S. Cl. ...................................... 73/861; 73/195; 222/639
[58] Field of Search ............... 73/861, 861.05, 861.77, 73/195, 198; 377/20, 21; 222/638, 639

[56] References Cited

U.S. PATENT DOCUMENTS

| | | |
|---|---|---|
| 2,018,538 | 10/1935 | Webb . |
| 2,428,383 | 10/1947 | Prangley et al. . |
| 3,020,749 | 2/1962 | Cropper et al. . |
| 3,144,046 | 8/1964 | Seessedberg .................... 73/195 X |
| 3,156,290 | 11/1964 | Goodall, Jr. et al. ............ 73/195 X |
| 3,376,744 | 4/1968 | Kister et al. ......................... 73/195 |
| 3,666,143 | 5/1972 | Weston . |
| 3,777,562 | 12/1973 | Clingman, Jr. ...................... 374/37 |
| 4,006,840 | 2/1977 | Shannon .......................... 377/21 X |
| 4,186,601 | 2/1980 | Maruoka ........................ 73/861.05 |
| 4,225,057 | 9/1980 | Horn . |
| 4,278,185 | 7/1981 | Williamson . |
| 4,363,441 | 12/1982 | Feinberg ......................... 374/39 X |
| 4,399,696 | 8/1983 | Feller ........................... 73/861.77 X |
| 4,399,709 | 8/1983 | Scharnitzky ..................... 73/861.77 |

Primary Examiner—Herbert Goldstein
Attorney, Agent, or Firm—Klarquist, Sparkman, Campbell, Leigh & Whinston

[57] ABSTRACT

A timed gas metering and distribution system provides a point of use metering and an individual remote meter readout capability in a branched-line gas distribution system, such as in a multi-unit apartment building. In such a system, a single main gas line enters the building and has branches of minimal length extending to a gas-fueled appliance, e.g., a heater, in each unit. Each heater has a fixed orifice in its gas line, to provide a specified fixed gas flow rate at a constant line pressure and an electrical pressure switch in its manifold to detect pressure changes and actuate an electrical circuit upon operation of the heater. The circuit transmits an electrical signal to a timing meter located remotely of the unit for convenient reading. One embodiment uses a direct current electrical circuit and a digitally controlled analog run-time meter. A second embodiment uses an oscillator low frequency pulsing circuit, shift register, and digital counter. It can be used to monitor gas consumption of multiple appliances by summing the pulse trains. As used in a fixed flow appliance, the pulsing circuit uses a mechanically tunable oscillator to proportion the pulse rates to constant pressure gas flow through a fixed orifice. For a variable flow appliance, e.g., a stove, a voltage-tunable oscillator, controlled by a switch-potentiometer coupled to the gas flow control, proportions the pulse rate to gas flow.

19 Claims, 4 Drawing Figures

TIMED GAS METERING AND DISTRIBUTION SYSTEM

BACKGROUND OF THE INVENTION

This invention relates generally to fuel gas distribution and metering, and more particularly to local distribution of fuel gas to multiple points of use, with gas consumption by each user separately metered for readout at a remote location.

In providing fuel gas utility service to multiple users in a single structure, such as residential units in an apartment or condominium building, it is desirable to individually meter gas consumption for each unit. Formerly, it was common practice to use a single meter on the main infeed gas line serving all of the units and to divide the charges equally among the units. This practice is now disfavored. It is not conducive to conservation and can unfairly overcharge frugal users to the undeserved benefit of those who use more gas.

As shown in FIG. 1 of the drawings, more modern practice provides for separate metering of each unit. Conventionally, it is done by dividing the main infeed gas line into branch lines outside the structure; installing separate meters in the branch lines at a single location, typically outside the building; and plumbing each unit individually for gas service. This approach to gas distribution and metering has several drawbacks.

First, conventional gas meters are positive displacement, mechanical devices which measure gas usage directly and are cumbersome and expensive. For easy reading and ventilation, to minimize the dangers of gas leakage, such meters are typically located outside the building which they serve. Ambient temperature variations over a wide range introduce small, but significant, measuring inaccuracies, necessitating use of temperature compensation means in such meters to minimize the inaccuracies. Other methods which have been proposed for directly measuring gas consumption—measurement of differential pressure or gas velocity through an orifice—are even more expensive and more prone to inaccuracy.

A second drawback is the cost of individually plumbing each unit for gas service. This cost is especially burdensome when retrofitting buildings originally equipped with a single meter for several units. Accordingly, it would be desirable to devise a fuel gas distribution and metering system which safely provides for separate metering of each unit, using inexpensive and highly accurate metering apparatus, but does not require running separate piping from outside the building into each unit. Heretofore, such a capability has not been available to the gas utility industry.

In fields other than fuel gas distribution, a variety of devices have been proposed for measuring flows or discharges of fluids. However, none meets the foregoing needs of the gas utility industry.

U.S. Pat. No. 2,018,538, to Webb, proposes a liquid measuring apparatus to indicate the amount of liquid draining from a constant level tank through a fixed orifice during a period of time indicated in gallons by a clock. The clock is mechanically coupled to, and actuated by, a linkage controlling the opening and closing of a valve in the orifice. U.S. Pat. No. 2,428,383, to Prangley et al., discloses a gasoline pump in which a speed regulator controlled by a valve maintains the flow of gasoline through the dispensing line at a constant rate. A pressure-sensing device senses gas flow to initiate metering of the gasoline by a mechanical metering device.

U.S. Pat. No. 3,020,749, to Cropper et al., discloses a viscosimeter for electronically measuring the amount of time required for a quantity of a fluid to drain from a capillary tube. The elapsed time is multiplied by a constant to produce a measure of viscosity. This device includes a binary counter comprising an oscillator and binary dividers connected to a counter indicator.

U.S. Pat. No. 3,666,143, to Weston, discloses a system for dispensing predetermined-volume units of beer from several beer taps, and includes a pressure-sensing device in its electrical circuitry to normalize the flow at different pressures. Manual operation of the beer tap initiates timing of a predetermined interval during which beer is dispensed. The total number of units of beer dispensed from each tap is electronically counted. U.S. Pat. No. 4,225,057, to Horn, also discloses a beer-dispensing monitor, which mechanically senses the flow of beer from the tap and measures the quantity of beer dispensed at a predetermined flow rate, by using a timer to time the duration of flow. U.S. Pat. No. 4,278,186, to Williamson, discloses a liquor-dispensing and monitoring device to control the volume of liquor dispensed in each unit from a liquor bottle. A tilt switch in the bottle cap actuates timer circuitry in the device whenever a drink is poured. Monitoring data is radio-transmitted to a remote receiver and computer, which counts the number of drinks dispensed from each bottle.

All of the foregoing devices deal with the measurement of liquid discharges over time. However, none of them pertains to the distribution and metering of fuel gas. More particularly, none addresses the problems faced by gas utilities in economically providing gas distribution services to multiple points of use, separately metering consumption of fuel gas by each user, and providing meter data for readout at a convenient location remote from the point of use of the gas. Accordingly, there remains a need for an improved fuel gas distribution and metering system.

SUMMARY OF THE INVENTION

One object of the invention is to provide for an improved fuel gas distribution and metering system.

Another object of the invention is to improve the method of distribution and metering of fuel gas in multi-unit buildings, such as apartment houses.

Another object of the invention is to minimize the cost and complexity of providing separately metered gas service to multiple units or appliances on branches of a main gas line.

A further object of the invention is to provide a point-of-use gas metering system capable of combining consumption data from multiple appliances for presentation on a single readout at a location remote from the appliances.

In furtherance of these objects, one aspect of the invention is a gas distribution and metering system for providing separately-metered gas service to units in a multi-unit structure. A main gas infeed line extends into the structure and has multiple branch gas lines, each branch gas line extending into a different unit of the structure to fuel one or more gas-operated appliances in the unit. The branch gas lines can branch from the infeed line at any convenient location within the structure, without constraint as to location of associated metering apparatus. Preferably, such lines are positioned in the structure so as to minimize their length and cost of installtion. Multiple meter readout means for displaying gas consumption by each unit are located remotely of the appliances, for example, outside or in the basement of the structure, where they can be conveniently read and serviced without entering the unit. An electrically operable metering means is connected to each of the appliances for measuring gas consumption by the appliance during operation and providing an electrical output signal corresponding to such gas consumption. Electrical wiring or other suitable signal transmission means transmits the output signal from the metering means to the meter readout means to update the readout of gas consumption during the operation of the appliance. Preferably, the metering means is designed for indirectly measuring gas consumption by sensing operation of the appliance and timing the gas flow at a predetermined rate to produce a reading on the meter readout means which is proportional to gas consumption.

In another aspect of the invention, a branch gas line distributes gas at a specified pressure to one or more appliances, each connected to a timed metering system. The gas lines includes means for controlling the rate of gas flow into each appliance during operation. Gas flow is metered by a means for sensing operation of each appliance and providing a corresponding electrical output signal. Timing means responsive to the output signal times the operation of each appliance and produces a timing signal. A calibration means for calibrating the timing means proportions the timing signal to the rate of gas flow during operation of the appliance. A meter readout means responsive to the timing signal displays a readout of gas consumption. A summing means can be provided between the timing means and the readout means for adding together the timing signals for multiple appliances so that the meter readout means displays the total gas consumption by all of the appliances to which it is connected.

Such a metering system preferably comprises a clocking means for generating clock pulses at a rate proportional to the consumption of gas by the appliance during operation. A gating means responds to operation of the appliance to enable transmission of clock pulses into an electrical signal line. The gating means can be a pressure-actuated electrical switch positioned in the gas line at the point of use to sense pressure in the gas line when operation of the appliance starts and stops. A counting means connected to the signal line counts the clock pulses to provide a cumulative count of pulses proportional to a specific volume of gas consumed by the appliance. The count is displayed on a visual readout, which is preferably calibrated in units of gas consumed. The clocking means can be an oscillator circuit which is tunable to proportion the rate of pulse generation to the rate of gas consumption at a specified flow rate. Oscillator tuning can be either mechanical, for use with appliances which consume gas at a fixed rate during operation, or electrical, for use with appliances which operate at different rates of gas consumption. Pulse duration is very short relative to the average time interval between them to avoid coincidence of pulses from two or more appliances at the summing means.

Other objects, features and advantages of the invention will become more readily apparent from the following detailed description of a preferred embodiment, which proceeds with reference to the accompanying drawings.

DETAILED DESCRIPTION

Figure 1:
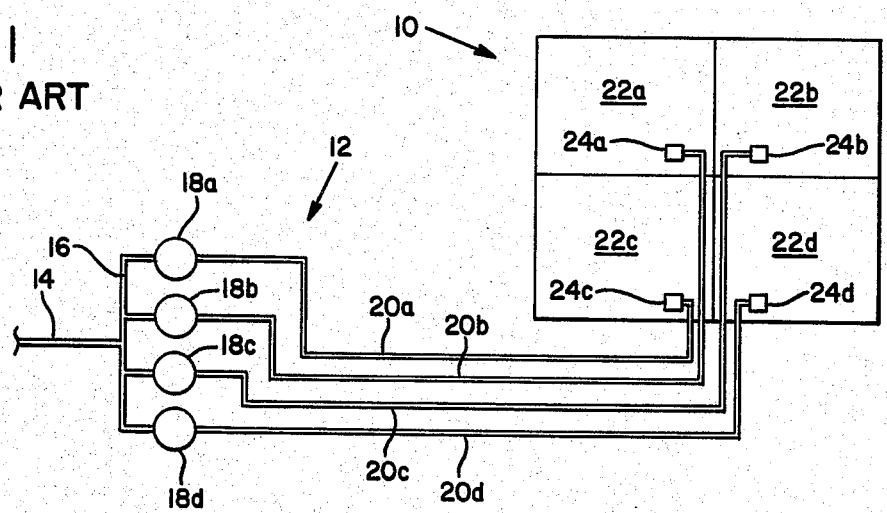
FIG. 1 is a diagram of a four-plex building structure in which each unit is provided with separately-metered fuel gas service in accordance with the prior art.

Referring to FIG. 1, separately-metered fuel gas service is conventionally provided to the individual units of a multi-unit structure 10, such as an apartment house, by distribution and metering system 12. Typically, this system includes a main infeed gas line 14 terminating either outside the structure or in its basement. At its terminus, the main gas line is divided into multiple branches 16. Each branch contains a conventional gas meter 18a–d. The gas meters are ordinarily located together outside or in the basement of structure 10. Individual branch gas lines 20a–d extend through the walls and floors of the structure 10 into each unit 22a–d, and to a gas-fueled appliance 24a–d, such as a furnace, water heater, gas-fired fireplace, or cooking stove. Often, more than one appliance is connected to a single branch line 20.

General Arrangement of Preferred Embodiment

Figure 2:
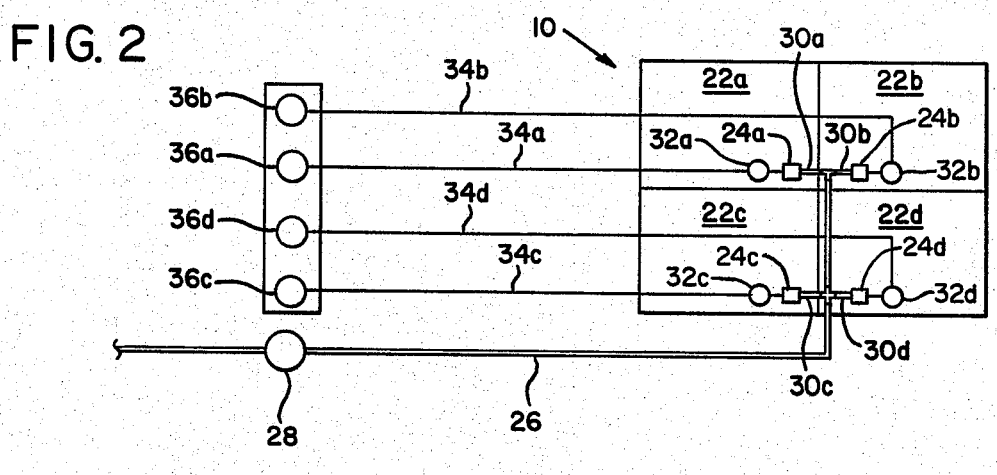
FIG. 2 is a diagram of a four-plex building structure in which each unit is provided with separately metered fuel gas service in accordance with the present invention.

Referring to FIG. 2, fuel gas service is provided to the units 22a–d of structure 10, in accordance with the invention, through a single main infeed line 26 extending into the structure. Although not required by the present invention, the main gas line can include a conventional gas meter 28 located outside the structure for metering total gas consumption by all of the units in the structure. Inside structure 10, multiple branch gas lines 30a–d extend from the main gas line to serve the gas-fueled appliances 24a–d located in units 22a–d. Infeed line 26 terminates at a convenient central location in the structure so as to minimize the length of branch lines 30a–d.

Each appliance is individually metered by an electrical indirect metering device 32a–d. During operation of one of the appliances 24a, the associated metering device 32a transmits an electrical signal via an electrical signal line 34a to a connected meter readout device 36a. The meter readout devices for all of units 22a–d are located together outside of the units, for example, outside structure 10 or in its basement adjacent meter 28, for convenient reading and servicing without disturbing the occupants of the units. Two embodiments of such metering apparatus are described in further detail hereinafter.

FIG. 3 Embodiment

Figure 3:
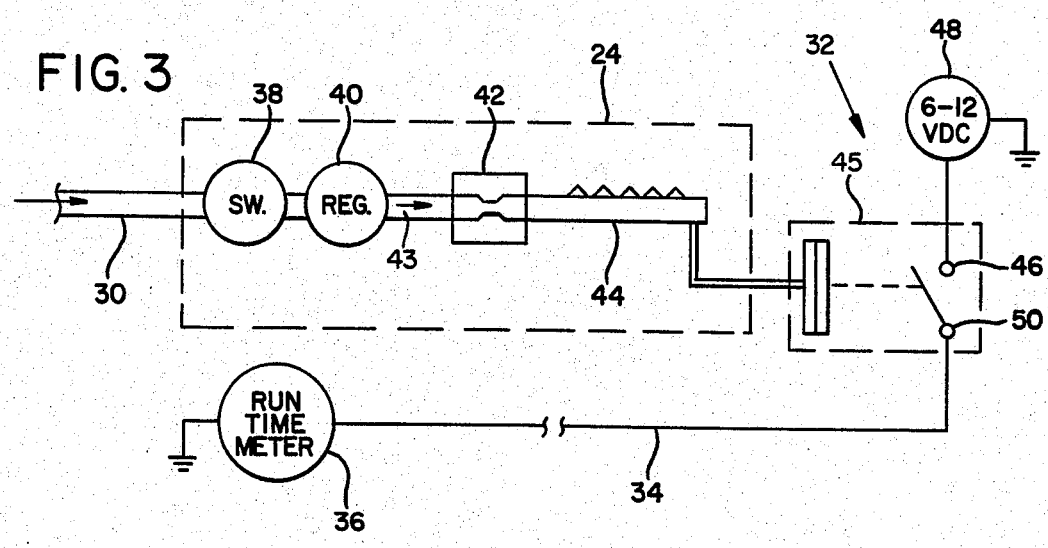
FIG. 3 is a diagram of an appliance for one of the units of FIG. 2, incorporating one embodiment of a timed gas metering system.

Referring to FIG. 3, the first embodiment of the invention is adapted for distribution and point-of-use metering of gas consumption by fixed flow rate appliances, such as hot water heaters or furnaces. Such appliances operate to draw either a full flow of gas at a predetermined rate, or no flow. Fuel gas is provided to appliance 24 through branch line 30 at a predetermined low delivery pressure, for example, about 7 inches of water column. The appliance includes, in series with line 30, a gas valve or safety switch 38, a pressure regulator 40, a fixed orifice 42, and a burner manifold 44. The pressure regulator 40 provides a constant gas pressure in the gas line section 43 between the regulator and fixed orifice 42. During operation of the appliance, gas flows through the fixed orifice into the burner manifold at a constant flow rate.

Connected to manifold 44 is a fuel gas pressure switch 45 which provides means for sensing operation of the appliance. When the appliance is turned on, gas flows through orifice 42 into manifold 44, raising the manifold pressure from 0 to about 3 inches of water column. Pressure switch 45 is a low pressure switch set to sense a change of gas pressure and turn the electrical switch on and off at predetermined actuation/deactuation-pressure settings when the appliance turns on and off. Operation of the appliance can alternatively be sensed thermally, but a pressure switch is preferred as being more accurate. A suitable pressure switch is the Dwyer MINITACTOR pressure switch, manufactured under U.S. Pat. No. 3,862,387. This switch is normally open and closes on rising pressure.

Connected in series with one electrical pole 46 of pressure switch 45 is a low-power, high-impedance or current-limited, direct-current voltage supply 48. The opposite pole 50 of switch 45 is connected through electrical output signal line 34 to running time meter 36. Meter 36 is a direct-current, quartz-controlled running time meter designed to switch on and off substantially instantaneously with no overrun of its movement. A suitable such meter is the Type T-557-A meter manufactured by H. H. Sticht Company, Inc. of New York, N.Y.

Operation of FIG. 3 Embodiment

The embodiment of FIG. 3 is used solely in units having a single, fixed flow rate appliance. It can be readily installed in either new construction or existing multi-unit structures retrofitted to provide separately-metered service, without altering the existing gas plumbing. Preferably, to minimize the amount and cost of plumbing in new construction, the capabilities afforded by the invention are best utilized by branching the gas plumbing within the structure, as illustrated in FIG. 2, rather than outside the structure, as in FIG. 1. Electric signal output lines 34 are easily and inexpensively installed in the walls of the structure to terminate at a convenient readout location outside each unit.

In operation, this embodiment indirectly meters gas consumption by appliance 24 as follows. When the appliance is turned on, gas flows at a constant rate through fixed orifice 42 into burner manifold 44. As soon as the pressure in the manifold exceeds a predetermined actuation pressure, for example, 2 inches of water column, pressure switch 32 closes contacts 46,50 to apply a direct current voltage from power supply 48 to run-time meter 36. When the appliance is turned off, gas ceases flowing through fixed orifice 42. As the pressure in manifold 44 drops below a preset deactuation pressure, for example, 0.5 inches of water column, switch 45 opens, and thereby stops running time meter 36. This process is repeated each time the appliance is turned on. When the display of meter 36 is read, the accumulated time since the previous reading is multiplied by a predetermined constant equal to the constant-pressure rate of gas flow through orifice 42. The product is the number of cubic feet of fuel gas used by appliance 24.

FIG. 4 Embodiment

Figure 4:
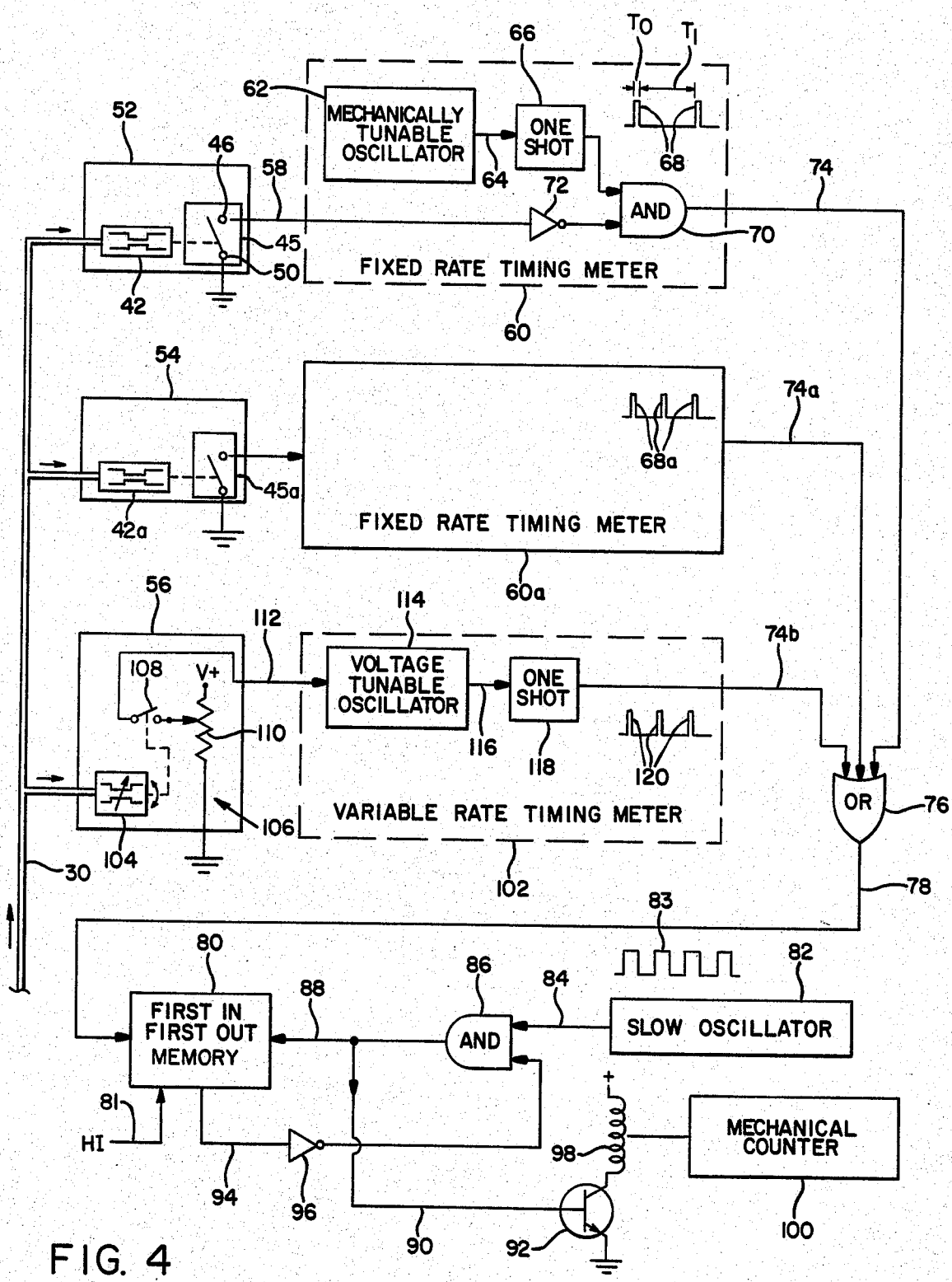
FIG. 4 is a diagram of a second embodiment of a gas metering system in accordance with the invention, for connecting multiple appliances to a single meter readout.

Referring to FIG. 4, the principles of the present invention can be extended to point-of-use metering of multiple appliances in a single unit, including appliances which consume gas at a variable rate during operation, such as gas ranges. This embodiment also provides means for calibrating each metering device to the appliance which it serves so as to provide a direct readout in cubic feet of the amount of gas consumed.

In the example shown in FIG. 4, an apartment unit has three gas-fueled appliances connected to branch line 30: a furnace 52, a hot water heater 54, and a cooking stove 56. For clarity, details of the appliances themselves, shown in FIG. 3 and otherwise well-known in the art, are omitted in FIG. 4.

Appliance 52 has a fixed orifice 42 providing a fixed rate of gas flow into its burner manifold (not shown) under constant pressure. A pressure switch 45 is connected to the manifold, as previously discussed, to sense changes in pressure in the manifold when gas commences and ceases flowing through the fixed orifice 42. Pole 50 of the switch is grounded and pole 46 of the pressure switch is connected through an electrical signal line 58 to a fixed-rate digital timing meter 60.

Timing meter 60 includes a tunable oscillator circuit 62 containing suitable divider circuitry having an output 64. This output is connected through a one shot circuit 66 to provide a continuous, low frequency train of pulses 68 to an AND gate 70. The time constant of one shot 66 is set so that the pulses are of very short duration $T_0$ relative to the time interval $T_1$ between them, as further described hereinafter. Pole 46 of pressure switch 45 is connected through line 58 and an inverter 72 to AND gate 70. Closure of switch 45 grounds line 58 and thereby enables the AND gate to pass pulses 68 through the AND gate onto an output timing signal line 74.

Appliance 54 is similarly equipped with a fixed rate timing meter 60a, having an output timing signal line 74a. In each of meters 60,60a, the oscillator is mechanically tuned to a specified frequency proportional to the gas flow rates through the fixed orifices 42,42a, of appliances 52,54, respectively, during operation.

Output lines 74,74a are input to an OR gate 76 to serially combining pulse trains 68,68a and transmit them as a single asynchronous pulse train (not shown) via output signal line 78 to a counting circuit, next described, designed to synchronously count the incoming, asynchronous pulses.

The first element of this counting circuit is a first-in, first-out memory 80. Memory 80 is an 8-bit integrated circuit memory designed to shift each input logic ONE bit, or pulse, toward the memory data output (at signal line 94) and hold it there until the pulse is clocked out. A suitable such memory is the Fairchild FIFO memory Part No. 3341. This memory has a "Clock In" input, to which signal line 78 is connected, and a "Data In" input, to which a continuous logic ONE or "HI" signal is applied via signal line 81.

A "slow" oscillator circuit 82, further described hereinafter, has an output 84 connected through an AND gate 86 to the "Clock-out" input of memory 80 via line 88. The output of AND gate 86 is also connected through a line 90 to a driver transistor 92. Memory 80 provides a data signal on data output line 94, through inverter 96, to the input of AND gate 86, to indicate the presence of one or more pulses in the memory. This signal gates pulses 83 from oscillator 82 through the AND gate until all of the pulses in memory 80 have been clocked out.

Each pulse 83 passing through AND gate 86 enables driver 92, via line 90, to energize an electrical circuit through an actuation coil 98 and thereby increment the count on a mechanical counter 100. The actuation coil and counter must have a counting rate capability or frequency response exceeding the average pulse rate on line 78. A suitable such device is the MINIATURE ELECTRIC SERIES, 1000-counts-per-minute counter, available from Durant Digital Instrument Division of Cutler-Hammer, Inc., Watertown, Wis. Oscillator 82 is tuned to produce pulses 83 at the rate of 1000 pulses per minute, to match the response of coil 98 and counter 100. This arrangement enables nearly coincident pulses to be stored in memory 80 until they can be correctly counted out at the rate set by oscillator 82.

Gas consumption by cooking stove 56 is metered by a variable rate timing meter 102. This meter is connected via an output line 74b to the input of OR gate 76 in the same manner as lines 74,74a. Cooking stove 56 has a manually adjustable control 104 so that the user can turn on and raise or lower the flame. Conventionally, such control is a rotatable valve operable by rotating a control knob on a shaft connected to the valve to vary the gas flow rate. The shaft of control 104 is mechanically coupled to a rotary switch-potentiometer 106 electrically connected to meter 102. The switch-potentiometer has an open switch position, indicated by switch 108, for opening the circuit to meter 102 when the stove is turned off, and a variable-resistance closed position, indicated by potentiometer, 110. Resistance of the potentiometer varies with change in position of control 104 to indicate, by different voltage levels on an output line 112, connected to meter 102, the amount of gas passing through control 104. During manufacturing design, the resistance chracteristic of the potentiometer is chosen to match the flow characteristics of the selected control valve 104, which can be non-linear, so that the voltage on line 112 is directly proportional to gas flow rate at all settings of valve 104.

Timing meter 102 includes a voltage-tunable oscillator circuit 114, controlled by the voltage on line 112 and having an output 116 connected to a one shot 118, like one shot 66, to produce a train of narrow-width pulses 120. The frequency of the pulses varies with the voltage on line 112 and thereby with the rate of gas flow through control 104. Pulse train 120 is output via line 74b to OR gate 76, and thereby added to the pulse trains on lines 74,74a for input into the first-in, first-out shift register 80 to increment mechanical counter 100, as described above.

Operation of FIG. 4 Embodiment

The embodiment of FIG. 4 is designed for use primarily in units having multiple gas-fueled appliances. It can serve either fixed or variable flow rate appliances. Otherwise, this embodiment can be installed and used in the system of FIG. 2 in the same manner as the FIG. 3 embodiment.

In operation, the embodiment of FIG. 4 generates one pulse per unit of time during which a predetermined volume of gas flows through flow control 42,42a,104, for example, one pulse per cubic foot of gas. The pulses are counted to indirectly meter the gas, and thereby provide a direct reading of units of gas consumption on counter 100. When meters 60,60a are first installed, their oscillators 62 are mechanically tuned to generate pulses at a rate proportional to the full-flow rate of gas flow through orifices 42,42a.

Their frequency is calibrated by tuning the oscillator to generate, for example, one pulse per cubic foot of gas flowing through orifice 42 into the appliance. Thus, meters 60,60a have typical pulse frequencies on the order of one to two pulses per minute, depending on the rate of gas consumption of the appliance. A gas furnace would have a pulse rate of, for example, two pulses per minute. For a gas hot water heater, such rate would be less, for example, one pulse per minute. As mentioned above, meter 102 and switch potentiometer 106 are calibrated as a unit during manufacture to match the flow rate characteristic of the selected make of valve 104.

Whenever one of appliances 52,54 turns on, the appropriate switch 45,45a closes to gate pulses through AND gate 70. Similarly, when a user turns on stove 56, by actuating control 104, switch 108 closes, applying a tuning voltage via line 112 to oscillator 114. Adjusting the setting of control 104 varies the tuning voltage to vary the pulse rate on line 74b.

OR gate 76 serially combines the pulse trains on lines 74,74a,74b and such pulses are produced in proportion to the respective rates of consumption of gas by appliances 52,54,56. These pulses are stored in memory 80 until being clocked out by oscillator 82. Each pulse increments the count on counter 100. Accordingly, the cumulative count on the counter is directly proportional to the number of cubic feet of gas used by appliances 52,54, so long as two pulses do not coincide.

As mentioned above, the duration $T_0$ of pulses 68,68a,120 is set so as to minimize coincidence of pulses on signal line 78. It is desirable to keep under-reporting of gas consumption to less than 0.01%. Within this parameter, pulse coincidence is minimized by a ratio of pulse duration $T_0$ to average time interval $T_1$ between pulses equal to 0.001, or less. For an average pulse time interval $T_1$ on line 78 of 10 seconds (three appliances operating simultaneously and generating an average of two pulses each per minute), the foregoing ratio is satisfied by setting one shots 66,118 to produce a pulse duration $T_0$ of less than 0.001 second. Of course, to further reduce the probability of pulse coincidence, to meter higher gas flow rates, or to meter many appliances together, a shorter pulse duration can be used.

Having illustrated and described the principles of my invention in two embodiments, it should be apparent to those skilled in the art that the invention can be modified in arrangement and detail without departing from those principles. I claim all modifications coming within the scope of the following claims.

I claim:

1. A fuel gas distribution and metering system for providing separately-metered gas utility service to units in a multi-unit structure, the system comprising:
   a main gas infeed line extending into the structure;
   multiple branch gas lines branching from the infeed line inside the structure, each branch gas line extending into a different unit in the structure to fuel a gas-fueled appliance therein and at least some of said branch gas lines connected to a plurality of said appliances;

a plurality of meter readout means for displaying a separate readout of gas consumption for each said unit at a common location remote from the appliances;

a plurality of electrically-operable metering means each connected to a different one of said appliances and including a sensing means for sensing gas flow through the burner of the appliance and providing an electrical output signal corresponding to gas consumption by said appliance; and an electrical signal transmission means for transmitting said electrical output signal from each of said metering means to one of said meter readout means;

the meter readout means being responsive to the electrical output signal to update the readout of gas consumption for each unit during operation of any of the gas-fueled appliance contained therein;

the sensing means including an electrical pressure switch responsive to a change in gas pressure in the appliance, upon commencing and ceasing operation, to actuate a switch in an electrical circuit including said electrical transmission means to enable the transmission of said electrical output signal.

2. A gas distribution and metering system for providing separately-metered gas utility service to units in a multi-unit structure, the system comprising:

a main gas infeed line extending into the structure;

multiple branch gas lines branching from the infeed line inside the structure, each branch gas line extending into a different unit in the structure to fuel at least one gas-fueled appliance therein;

meter readout means for displaying a separate readout of gas consumption for each said unit at a common location remote from the appliances;

electrically-operable indirect metering means connected to each of said appliances for measuring gas consumption by said appliance and providing a corresponding electrical output signal; and an electrical signal transmission means for transmitting said electrical output signal from each of said metering means to a different one of said meter readout means;

the meter readout means being responsive to the electrical output signal to update the readout of gas consumption for each unit during operation of any of the gas-fueled appliances contained therein;

said indirect metering means including gas flow control means in the line fueling each appliance for infeeding gas to the appliance during operation at a predetermined flow rate and gating means responsive independently of gas flow rate to operation of the appliance for enabling transmission of said electrical signal during said operation;

the electrical signal being preset to quantize the predetermined flow rate;

the gating means including sensing means for sensing operation of the appliance and responding thereto to enable said transmission;

the sensing means including an electrical pressure switch responsive to a change in gas pressure in the appliance, upon commencing and ceasing operation, to actuate a switch in an electrical circuit including said electrical transmission means.

3. A gas distribution and metering system according to claim 2 in which the gas flow control means comprises a fixed orifice in a constant pressure gas line.

4. A gas distribution and metering system according to claim 2, in which the meter readout means comprises a running time meter responsive to said electrical signal to update the readout of gas consumption during operation and to cease updating the readout promptly upon cessation of said electrical signal, so that the readout is proportional to an amount of gas consumed by the appliance.

5. A gas distribution and metering system according to claim 4 in which the running time meter is a direct current controlled meter and the electrical signal is a switched direct current signal.

6. A gas distribution and metering system according to claim 4 in which the running time meter is a digital counter and the electrical signal is a switched pulse train having a pulse frequency proportional to the rate of gas flow.

7. A timed gas metering system according to claim 2 in which the meter readout means is a running time meter connected to the appliance through an electrical signal line and calibrated in proportion to said predetermined rate of flow.

8. A metering system according to claim 7 in which the transmitting means is a low power, direct current source and the running time meter is a direct current-operable quartz-controlled meter.

9. A gas distribution and metering system for providing gas utility service, the system comprising:

a gas line extending to at least one gas-fueled appliance;

meter readout means for displaying a readout of gas consumption by the appliance;

electrically-operable indirect metering means connected to each of said appliances for measuring gas consumption by said appliance and providing a corresponding electrical output signal; and an electrical signal transmission means for transmitting said electrical output signal from said metering means to said meter readout means;

the meter readout means being responsive to the electrical output signal to update the readout of gas consumption during operation of any of the gas-fueled appliances;

said indirect metering means including gas flow control means in the line fueling each appliance for infeeding gas to the appliance during operation at a predetermined flow rate, and gating means responsive to operation of the appliance for enabling transmission of said electrical signal during said operation;

the gas flow control means comprising a variable orifice in a constant pressure gas line and the gating means including means controllably coupled to said variable orifice for varying the electrical output signal in proportion to variation in size of said orifice.

10. A point-of-use gas metering system for metering gas consumption at plural points of use and transmitting meter data to a location remote from said points of use, comprising:

an infeed gas line distributing gas at a specified pressure to a first appliance and a second appliance;

a pair of flow control means in said gas line for controlling the rate of gas flow into each of said appliance during operation to enable different flow rates for said appliances;

a pair of metering means for sensing operation of each appliance and producing corresponding first and second electrical output signals independently of said flow rates;

a pair of timing means responsive to said output signal of each of said metering means for timing the operation of each of said first and second appliances and producing corresponding first and second timing signals preset in proportion to said flow rates;

summing means for adding said first and second timing signals to produce a third timing signal of a repetition rate different than said first and second timing signals; and a single meter readout means responsive to the third timing signal for displaying a readout of total gas consumption by the first and second appliances;

said meter readout means including memory means for accumulating pulses in an asynchronous pulse train defining said third timing signal and means for synchronously clocking said pulses from the memory means.

11. A point-of-use gas metering system according to claim 10, including means for calibrating the timing means for each appliance to proportion said timing signals to the rate of gas flow into the associated appliance.

12. A point-of-use gas metering system according to claim 11 in which the timing means comprise means for generating pulse trains defining said first and second timing signals, and the third timing signal is a pulse train of greater pulse repetition rate than said first and second timing signals, and the meter readout means comprises a digital counter.

13. A point-of-use gas metering system for metering gas consumption at plural points of use and transmitting meter data to a location remote from said points of use, comprising:

an infeed gas line distributing gas at a specified pressure to a first appliance and a second appliance;

means in said gas line for controlling the rate of gas flow into each said appliance during operation;

means for sensing operation of each appliance and providing corresponding first and second electrical output signals;

timing means responsive to said output signal for timing the operation of each appliance and producing corresponding first and second timing signals;

summing means for adding said first and second timing signals to produce a third timing signal;

a single meter readout means comprising a digital counter responsive to the third timing signal for displaying a readout of total gas consumption by the first and second appliances; and means for calibrating the timing means for each appliance to proportion said timing signals to the rate of gas flow into each appliance;

said timing means comprising means for generating pulse trains defining said first and second timing signals;

said counter including memory means for accumulating pulses in an asynchronous pulse train defining said third timing signal and means for synchronously clocking said pulses from the memory means.

14. A timed gas metering system for measuring consumption of gas by an appliance, comprising:

sensing means for sensing the flow of gas through the burner of said appliance and producing a corresponding output signal;

clocking means for generating clock pulses at a preset rate proportional to a predetermined rate of consumption of gas by the appliance during operation;

gating means responsive to the output signal of the sensing means for enabling transmission of said clock pulses onto an electrical signal line only during operation of the appliance;

counting means operably connected to said signal line for counting said pulses to provide a cumulative count of pulses proportional to a specified volume of gas consumed by the appliance;

means for recording said count;

the clocking means including an oscillator which is tunable independently of the gas flow rate to generate said clock pulses at a specified fixed rate proportional to said flow rate, and the appliance including fixed gas flow rate control means for infeeding gas to the appliance at a fixed flow rate;

the gas flow rate control means comprising a fixed orifice in a constant pressure gas infeed line and the gating means including a gas pressure operable electrical switch in said line for sensing gas pressure in the appliance when gas is flowing through said orifice.

15. A timed metering system for measuring consumption of gas by an appliance in which the appliance includes variable gas flow rate control means actuable for infeeding gas to the appliance at a selected flow rate, comprising:

clocking means for generating clock pulses at a rate proportional to rate of consumption of gas by the appliance during operation;

gating means responsive to operation of the appliance for enabling transmission of said clock pulses onto an electrical signal line during operation of the appliance;

means for recording said count;

said clocking means including an oscillator tunably coupled to the variable flow rate control means for generating said clock pulses at a variable pulse rate proportional to said selected flow rate.

16. For measuring consumption of gas by at least two of said appliances, a metering system according to claim 15 comprising one of said clocking means and one of said gating means for each appliance and a summing means operatably connected into each electrical signal line for adding together the clock pulses for each appliance into a single pulse train and applying said pulse train to the counting means.

17. A metering system according to claim 16 in which each of said clocking means includes means for limiting the duration of said pulses relative to the time interval between the pulses so as to minimize coincidence of said pulses in the single pulse train.

18. A timed gas metering system for measuring consumption of gas by at least two appliances, comprising:

for each appliance, clocking means for generating clock pulses at a rate proportional to rate of consumption of gas by the appliance during operation;

for each appliance, gating means responsive to operation of the appliance for enabling transmission of said clock pulses onto an electrical signal line during operation of the appliance;

summing means operably connected into each electrical signal line for adding together the clock pulses for each appliance into a single pulse train and applying said pulse train to the counting means; and counting means operably connected to said signal line for counting said pulses to provide a cumulative count of pulses proportional to a specified volume of gas consumed by the appliances;

said counting means including means for asynchronously storing a number of the pulses in said single pulse train and means for synchronously clocking the stored pulses to increment the count in the means for visually displaying the count.

19. A timed metering system according to claim 18 including a third appliance, in which the system includes a clocking means for the third appliance which includes an oscillator which is tunable independently of the gas flow rate to generate said clock pulses at a specified fixed rate proportional to said flow rate, and the third appliance includes fixed gas flow rate control means for infeeding gas to the appliance at a fixed flow rate.

* * * * *